United States Patent [19]
Friebele et al.

[11] Patent Number: 5,488,475
[45] Date of Patent: Jan. 30, 1996

[54] ACTIVE FIBER CAVITY STRAIN SENSOR WITH TEMPERATURE INDEPENDENCE

[75] Inventors: Edward J. Friebele, Cheverley, Md.; Alan D. Kersey, Fairfax Station, Va.

[73] Assignee: The United States of America as represented by the Secretary of the Navy, Washington, D.C.

[21] Appl. No.: 220,855

[22] Filed: Mar. 31, 1994

[51] Int. Cl.$^6$ .................................... G01B 9/02
[52] U.S. Cl. ................ 356/352; 356/349; 356/345; 356/35.5; 385/12; 372/6
[58] Field of Search .................. 356/345, 350, 356/349, 352; 385/12; 372/6, 1, 94; 250/227.19, 227.27

[56] References Cited

U.S. PATENT DOCUMENTS

| | | | |
|---|---|---|---|
| 4,886,333 | 12/1989 | Hicks | 385/12 |
| 4,967,416 | 10/1990 | Esterowitz et al. | 372/6 |
| 5,231,611 | 7/1993 | Laznicka, Jr. | 356/345 |
| 5,305,335 | 4/1994 | Ball et al. | 372/92 |
| 5,317,576 | 5/1994 | Leonberger et al. | 385/37 |

OTHER PUBLICATIONS

Fiber Optic Sensors: An Introduction for Engineers and Scientists (Eric Udd, ed., John Wiley & Sons, Inc. 1991), §§10.3–10.5 and §§14.1–14.5 (pp. 303–320 and 439–467).
A. D. Kersey et al., Er–Doped Fiber Ring Laser Strain Sensor, Fiber Optic Smart Structures and Skins V, SPIE vol. 1798, at p. 280 (Copyright 1993).
Letter dated Feb. 24, 1994, from Jane De Neui to Ed. Miles, concerning reference AB, above.
G. Meltz et al., Formation of Bragg Gratings in Optical Fibers by a transverse Holographic Method, 14 Optics Letters 823 (No. 15, 1 Aug. 1989).
A. Kersey et al., New Non–Linear Phase Transduction Method for DC Measurand Interferometric Fibre Sensors, 16 Electronics Letters 75 (No. 2, 16 Jan. 1986).
W. W. Morey et al., Multiplexing Fiber Bragg Grating Sensors, SPIE vol. 1586, Distributed and Multiplexed Fiber Optic Sensors (1991).
D. A. Smith et al., Acoustically Tuned Erbium–Doped Fiber Ring Laser, 16 Optics Letters 387 (No. 6, 15 Mar. 1991).
N. Park et al., All Fiber, Low Threshold, Widely Tunable Single–Frequency, Erbium–Doped Fiber Ring Laser with a Tandem Fiber Fabry–Perot Filter, 59 Appl. Phys. Lett. 2369 (No. 19, 4 Nov. 1994).
B. D. Zimmermann et al., Fiber–Optic Sensors Using High–Resolution AF Optical Time Domain Instrumentation Systems, 8 J. of Lightwave Technology 1273 (No. 9, Sep., 1990).

*Primary Examiner*—Samuel A. Turner
*Assistant Examiner*—Robert Kim
*Attorney, Agent, or Firm*—Thomas E. McDonnell; Edward F. Miles

[57] ABSTRACT

A strain sensor system formed from a laser cavity where changes in length of the cavity are used to measure strain. The cavity can include a passive optical fiber strain sensing section and/or an active doped optical fiber section that lases when pumped by a laser pump. The cavity can be a ring or linear cavity with or without mode locking. The light oscillating in the cavity sets up multiple oscillation modes. The multiple modes create beat modes or frequencies. The measured frequency difference between beat mode frequencies is inversely proportional to the length of the cavity. The measured frequency change in one of the mode frequencies or one of the beat frequencies is proportional to the absolute strain on the fiber. A heavy metal fluoride glass sensing section makes the sensor temperature insensitive.

13 Claims, 3 Drawing Sheets

ACTIVE FIBER CAVITY STRAIN SENSOR WITH TEMPERATURE INDEPENDENCE

BACKGROUND OF THE INVENTION

1. Field of the Invention

The present invention is directed to an optical fiber strain sensor that uses a ring or linear laser cavity to detect strain and, more particularly, to a cavity that uses an active doped fiber section to set up multiple oscillation modes in the cavity which create beat frequencies used to determine fiber strain and which includes a section of the fiber which is insensitive to thermally created apparent strain.

2. Description of the Related Art

There is a significant need for low cost sensors that can be embedded in or surface-mounted on structural materials to monitor static and dynamic strain. Some examples of the need for static strain sensing include: monitoring the deformation of shape-critical parts of spacecraft (antennas, interferometric booms, etc.) caused by thermal excursions, slew maneuvers or debris damage; detecting the onset of cracking in airplane wings; monitoring the strain at joints between structural elements in submersible vehicles induced by static pressure at depth; and detecting deformation and initial damage in a wide range of structures, which might include runways, carrier decks, ship hulls, bridges, and even buildings.

In many of these applications, there is an additional requirement that the electronic instrumentation associated with the sensor be low power and light weight and that the elements of the sensor be low cost and readily available. Also, it would be desirable that the sensor report a measurand related to absolute strain (rather than strain relative to some initial value), so that the sensor need not be constantly interrogated to maintain calibration.

Typical fiber optic strain sensors in use today are based on the principle of interferometry where the sensor consists of a sensing fiber leg and a reference fiber leg. The length of the sensing leg is changed by the strain applied to the fiber. The optical phase shift between the two legs is a measure of the length change and the strain. In general, interferometric sensors cannot provide measurement of the absolute length of the sensing leg, only measurement of the change in length, i.e., strain, relative to a baseline measurement made when the sensor system was activated. No knowledge of strain of length changes can be obtained for periods when the instrumentation is turned off or disconnected from the sensing fiber. Subsequent strain measurements are made relative to a new baseline obtained when the instrumentation is reactivated.

More recently strain sensors using fiber reentrant loops have been proposed. Use of a loop of fiber to detect strain has been reported in J. Lightwave Technology, 8, 1273 (1990) by R. O. Claus and coworkers at the Virginia Tech Fiber and Electro-Optics Research Center. In the embodiment discussed in the Claus paper, a pulse is inserted into the loop via a coupler. Each time the pulse travels around the loop, the coupler extracts and outputs a very small portion of the light (25–30 dB). These couplers, which are made by attaching a 50 micron core injection-tapoff fiber to a 200 micron core fiber in the loop, are a specialty product of Litton Scientific. A detector on the output senses a decaying series of pulses whose frequency is the inverse of the optical path length of the loop. The intensity of the pulse is attenuated by the loss in the fiber loop and the coupler (typically 0.3–0.4 dB) in addition to the amount of light extracted by the tap-off coupler on each pass. In addition, the breadth of the pulse increases due to the dispersive characteristics of the 200 micron core multimode fiber used in the loop. Although use of single mode fiber would significantly reduce the dispersion, it is extremely difficult to fabricate low loss, asymmetric tap-off couplers from single mode fiber; thus, these reentrant loop schemes have generally used a large core multimode fiber and have operated at 0.85 or 1.3 µm. Claus et al. have reported that attenuation and dispersion limit the sensitivity to a fiber elongation of 5–10 µm.

A second embodiment was also proposed and demonstrated by Claus et al. Here a partially reflective splice (once again a hand-fabricated item) is introduced into the loop. A specially-modified optical time domain reflectometer (OTDR) sends a pulse into the loop and monitors the weak reflections from the splice as the pulse transits the loop. The OTDR must be modified to increase its dynamic range. In addition to the problems with attenuation and dispersion described above, this technique requires an OTDR, which is a bulky, expensive piece of laboratory equipment, and the use of special tap-off couplers to maintain as much of the optical signal circulating in the loop as possible.

These prior art strain sensors, in addition to being expensive to make, are sensitive to temperature changes that cause inaccurate strain measurements. This cross sensitivity to temperature is the most significant limitation in optical strain sensors developed to date. Temperature variations can cause changes in the optical path length, through direct changes in the physical length of the sensor and through changes in the refractive index. Changes in optical path length appear to the measurement instruments as strain. These temperature variations limit the sensitivity of the sensor.

The reentrant loop sensors provide absolute measurement but only with limited sensitivity. The interferometric sensors developed to date provide relative strain measurement.

What is needed is an optical fiber strain sensor that is independent of thermal apparent strain (that is, athermal), inexpensive, and capable of intermittent absolute strain measurements.

SUMMARY OF THE INVENTION

It is an object of the present invention to provide an optical fiber strain sensor that is insensitive to temperature changes.

It is another object of the present invention to provide a sensor which is divisible into two parts: a strain sensing component and an optical electronics instrumentation package which can be carried from sensor component to sensor component making a system of sensors less costly.

It is also an object of the present invention to provide a sensor capable of measuring absolute strain.

It is an additional object of the present invention to provide a strain sensor in which strain can be intermittently measured without establishing a new baseline.

It is a further object of the present invention to provide a sensor in which measurements can be made over a long gage length.

It is a further object of the present invention to provide a strain sensor which produces a frequency output for simple post-processing.

The above objects can be attained by a sensor formed as a laser ring cavity or linear cavity where changes in a length of the cavity are used to measure strain. The cavity can be an active doped fiber section or an active section plus a passive section. The light oscillating in the cavity forms multiple oscillation modes. The multiple modes of oscillation create stable beat modes or frequencies. Frequency locking to one of the beat modes can be performed. The measured frequency spacing between the beat modes is inversely proportional to the absolute optical path length of the fiber. The measured frequency change in one of the stable beat frequencies is proportional to the strain on the fiber. Temperature insensitivity is provided by making the sensing section of an athermal glass such as heavy metal fluoride glass.

These together with other objects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
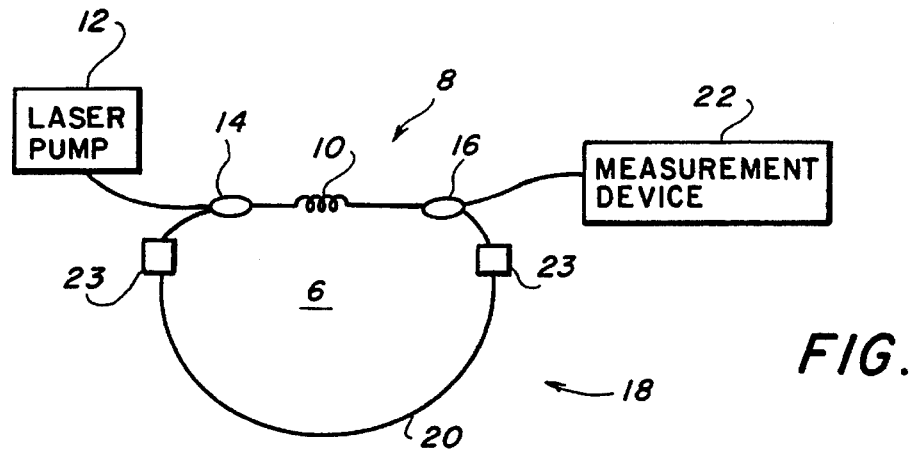
FIG. 1 depicts the components of a first ring cavity embodiment of the present invention.

The present invention combines a laser cavity that can be changed in length by strain with a device for measuring the change in cavity oscillation frequency, particularly the beat frequency between laser modes, caused by the length change. The first and preferred embodiment is a ring laser cavity 6, as illustrated in FIG. 1, includes an active fiber gain section 8 which includes an Er-doped fiber 10, such as found in an EDFA3000 amplifier available from BT & D, Inc., pumped by a conventional pump laser 12, such as a 1480 nm laser. The erbium doping must be sufficient to give laser cavity 6 a gain in excess of unity. The ring cavity 6 also includes an a 3 dB output coupler 16, such as is available from Gould, Inc. A sensing section 18 including a low cost conventional optical fiber 20, such as a standard 1.55 μm single mode telecommunications fiber available from many manufacturers, is coupled to the active section 8 by the two couplers 14 and 16. The fiber 20 can be: attached to, bonded to or surface mounted on an object in which strain is to be sensed, such as a steel beam or a pipe; embedded in the object, such as concrete or fiber reinforced composite; fixed between two points, such as across an earthquake fault; or otherwise provided in a configuration where the fiber 20 is stretched when a strain to be measured occurs. The fiber 20 can be from a few meters to many kilometers in length. The output from the active section 8 is provided to a measurement device 22 which includes a conventional optical to electrical converter (photodetector) and a tracking RF spectrum analyzer such as a 8657B available from Hewlett Packard, Inc.

To reduce the cost of a system of strain sensors the configuration of FIG. 1 can be provided with conventional fiber connectors 23, allowing the active section 8, including the pump laser 12 and measurement device 22, to be detached from the strain sensing section 18, which could be buried in the concrete of a bridge. With such an arrangement a single active section 8 can serve many strain sensing sections 18.

Figure 2:
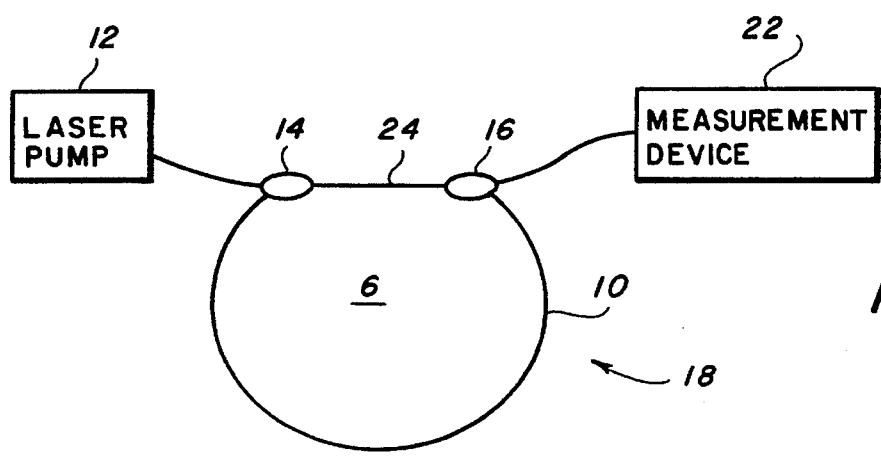
FIG. 2 illustrates the components of a second ring embodiment.

A second ring embodiment, as illustrated in FIG. 2, includes the active fiber 10 in the sensing section 18, so that the gain medium also serves as the strain sensing element. The two couplers 14 and 16 can be coupled by a fiber 24 which can be an Er-doped fiber or the inactive fiber such as that discussed above or can be coupled directly together (not shown).

Figure 3:
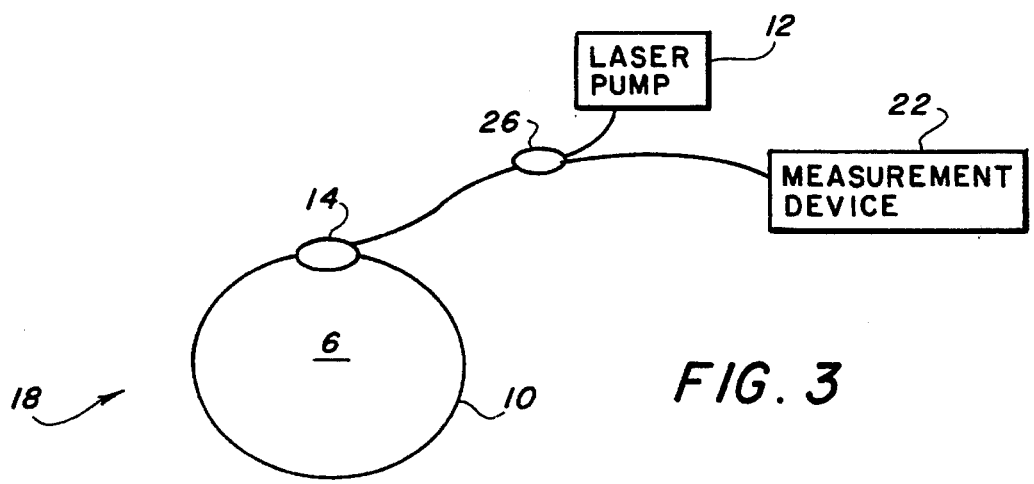
FIG. 3 shows a third ring embodiment.

A third ring embodiment includes only a wavelength division multiplexing (WDM) coupler 14 in the ring or sensing section 18 and a second WDM coupler 26 which couples both the pump laser 12 and the measurement electronics 22 to the ring as shown in FIG. 3.

In the ring cavity laser configurations of FIGS. 1–3 lasing is supported in both directions around the ring. This leads to spatial hole burning in the gain medium, and thus relatively unstable, multimode operation of the laser. The frequency spacing between the modes is given by the cavity free spectral range:

$$V = c/D \quad (1)$$

where $D=nL$ is the effective free-space optical length of the ring cavity, L is the ring cavity length, n is the fiber core refractive index and c the free-space velocity of light. Examination of the output of such a free-running ring laser configuration shows beat-notes at multiples of v, (i.e., mv with m integer) arising due to multiple-cavity mode interaction. For the m th order beat note (i.e. frequency mv) the change in beat note frequency with ring fiber length is given by:

$$\delta v = -\frac{mc}{D^2} \delta D \quad (2)$$

If the cavity comprises two fiber sections $L_o$ and $L_s$, one of which is subject to strain ($L_s$) and the other is not ($L_o$), then we can express D as:

$$D = n(L_o + L_s) \quad (3)$$

The change in cavity length with fiber strain is then:

$$\delta D = n\xi \delta L_s \quad (4)$$

where ξ is determined by the strain-optic coefficients of the glass fiber. The change in cavity beat note for the m-th order beat is thus:

$$\delta v = -\frac{mc}{D^2} n\xi \delta L_s$$

Relating this to fiber strain we get:

$$\delta v = -\frac{mc}{D^2} n\xi L_s \epsilon \quad (6)$$

where ε is the fiber strain (ΔL/L). Rewriting (6) using eqn. 1, we find:

$$\delta v = -mv \frac{L_s}{(L_o + L_s)} \xi \epsilon \quad (7)$$

In terms of the relative shift of the beat note, $$\frac{\delta v}{mv} = -\frac{L_s}{(L_o + L_s)} \xi \epsilon \quad (8)$$

i.e. the fractional change in the m-order mode-mode beat frequency is proportional to the product of the fiber strain $\epsilon$, the strain-optic coefficient $\xi$, and the ratio of strained fiber to total fiber length. In the case where the entire ring is subject to the strain (i.e. $L_o=0$), equation reduces to the simple expression $$\frac{\delta v}{mv} = -\xi \epsilon \quad (9)$$

The typical mode-mode beat spectrum for the configurations described herein includes many beat notes at multiples of cavity spacing. In general, some of the individual beat notes for a particular cavity length will randomly fade in and out on time scales of a few tenths of seconds. To create a sensor a stable beat note must be selected for the basis of the strain measurement. A person of ordinary skill in the art can monitor the spectrum of a particular cavity length and visually determine the stable beat notes for the particular configuration specified by the designer. The higher the stable beat note that is selected for the basis of the measurement the greater the strain resolution or the smaller strain that can be detected.

Figure 4:
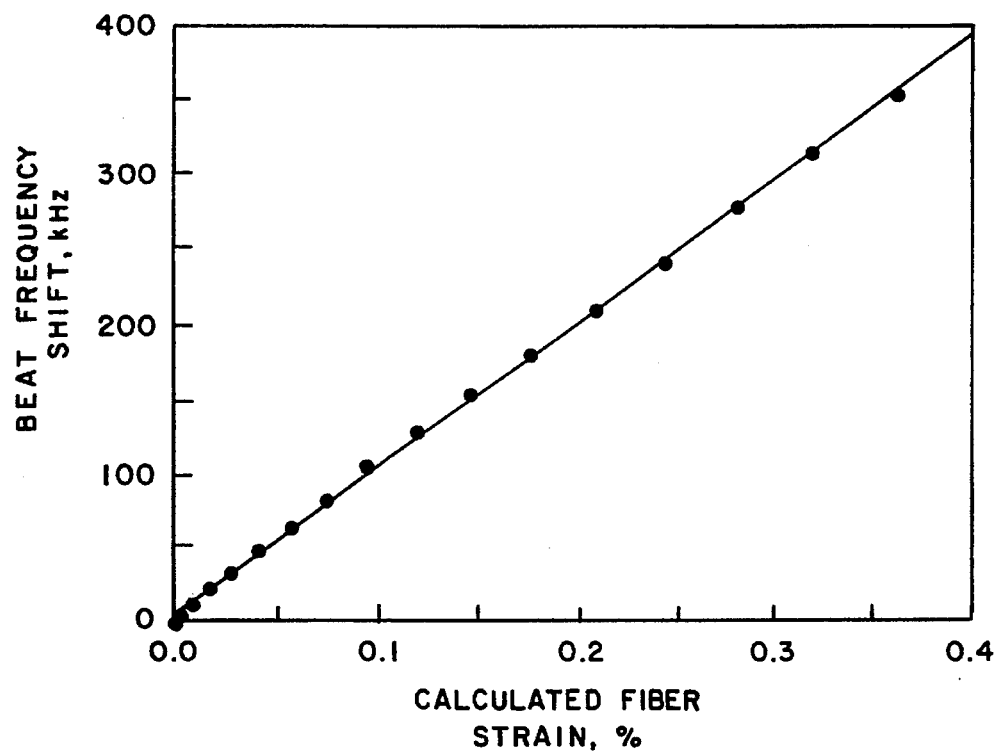
FIG. 4 illustrates the relationship between strain and beat frequency in a configuration such as FIG. 1.

When the configuration of FIG. 1 is used with twenty meters of sensing fiber 20 and a 20 meter active laser section 10 a stable beat note of approximately 343 megahertz (corresponding to the m=83rd order beat note) is produced. When this beat note is used for strain measurement, a shift in beat frequency relative to fiber strain occurs as shown in FIG. 4. As can be seen when the fiber 20 is not under strain there is no frequency shift and when strained a substantially linear change in the beat frequency occurs. Thus, a strain measurement is possible at any time simply by measuring the beat frequency and absolute strain is referenced to a baseline measurement performed before the fiber was strained. Because the beat frequency of the cavity is measured without reference to a baseline, the sensor reports absolute strain and need not be continually interrogated. This allows for periodic strain measurements with the instrumentation being capable of being turned off or disconnected between measurements.

Figure 5:
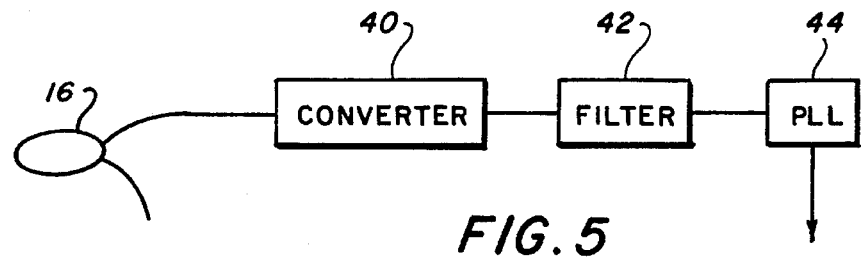
FIG. 5 illustrates an alternate frequency shift method.

Rather than using the rather expensive tracking spectrum analyzer described above to detect the shift in beat frequency, a less expensive and simpler configuration could be used such as illustrated in FIG. 5. In this configuration the coupler 16 is connected to a conventional optical to electrical converter 40 that provides an electrical signal to a conventional bandpass filter 42 which passes signals with a frequency range just below and above the selected beat frequency. The bandwidth should be sufficient to allow the shifted beat frequency for the maximum expected strain to pass the filter 42. The shift in the beat frequency is tracked by a conventional phase-locked loop 44 which produces a tracking signal as an output which proportional to the strain. A voltage controlled oscillator or a frequency counter could be substituted for the PLL 44.

Figure 6:
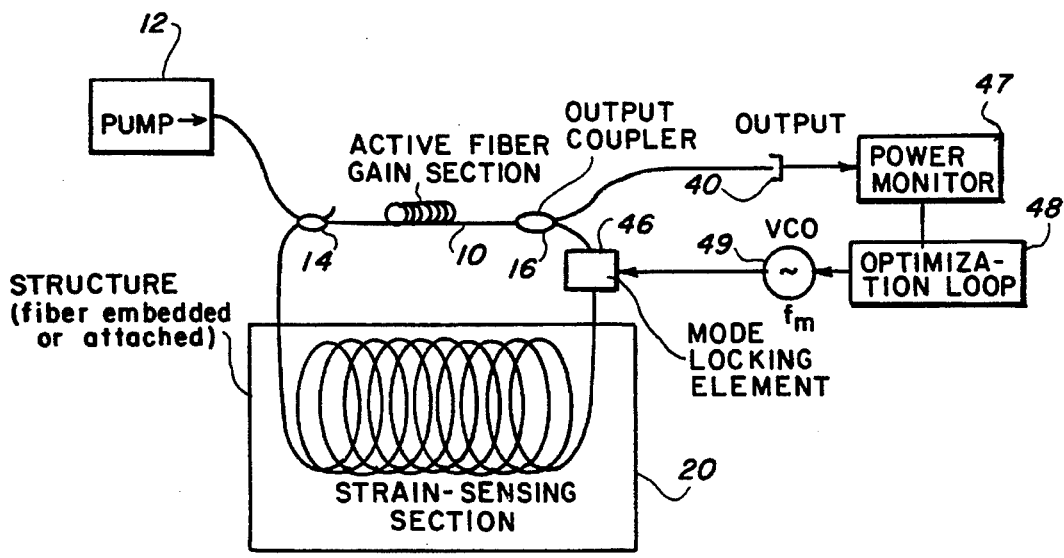
FIG. 6 shows a mode locked ring embodiment.

An alternate method of strain detection in a ring cavity configuration is illustrated in FIG. 6. This embodiment uses mode locking at some multiple of cavity mode spacing. In this configuration a mode locking unit 46, such as an integrated optic intensity modulator available from Crystal Technology, is coupled to the ring. The output is monitored by a power monitor 47, and provides a power level tracking signal to an optimization loop unit 48. The optimization unit 48 drives a voltage controlled oscillator 49. The voltage controlled oscillator 48 controls the tuning of the locking unit 46. The feedback controlled tuning of the mode locking unit 46 to achieve optimum power output provides a means of tracking the exact mode locking frequency which is proportional to actual strain in the ring.

Figure 7:
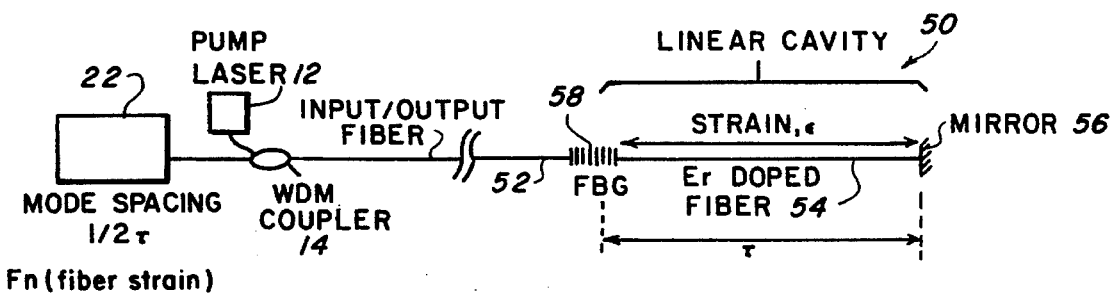
FIG. 7 illustrates a linear cavity embodiment.

A linear cavity embodiment of the strain sensor of the present invention includes the pump laser 12, coupler 14 and measurement electronics 22 of the prior embodiments, as illustrated in FIG. 7. In this embodiment the cavity 50 is coupled to the coupler 14 by a conventional optical communications fiber 52, such as that described previously. The cavity 50 is formed using a length of Er-doped fiber 54, such as that previously mentioned, a conventional fiber mirror 56, such as obtained by silver coating the fiber end face, and an intra-core fiber Bragg grating (FBG) 58. The Bragg wavelength of the FBG 58 is in the lasing wavelength range of the dopant of the fiber 54 (that is, typically 1530 nm to 1565 nm for Er-doped fiber). The cavity 50 of length L is pumped remotely along the undoped fiber input/output lead 52 which itself may be a few meters to a few kilometers long allowing remote sensing of many sites from a central location. The FBG 58 is effectively transparent at the pump wavelength (typically 1480 nm or 960 nm) so that the pump light is efficiently coupled to the doped fiber cavity 50. The cavity will lase at the FBG 58 Bragg wavelength. For a cavity of approximately 2 meters the mode spacing will be approximately 50 MHz and approximately 250 modes would lie under a typical 0.1 nanometer FBG 58 bandwidth providing the same multimode operation, as in the ring cavity embodiment, and producing beat notes at the output which can be used by the measurement device 22 to determine the absolute length of the cavity 50 as previously discussed.

Figure 8:
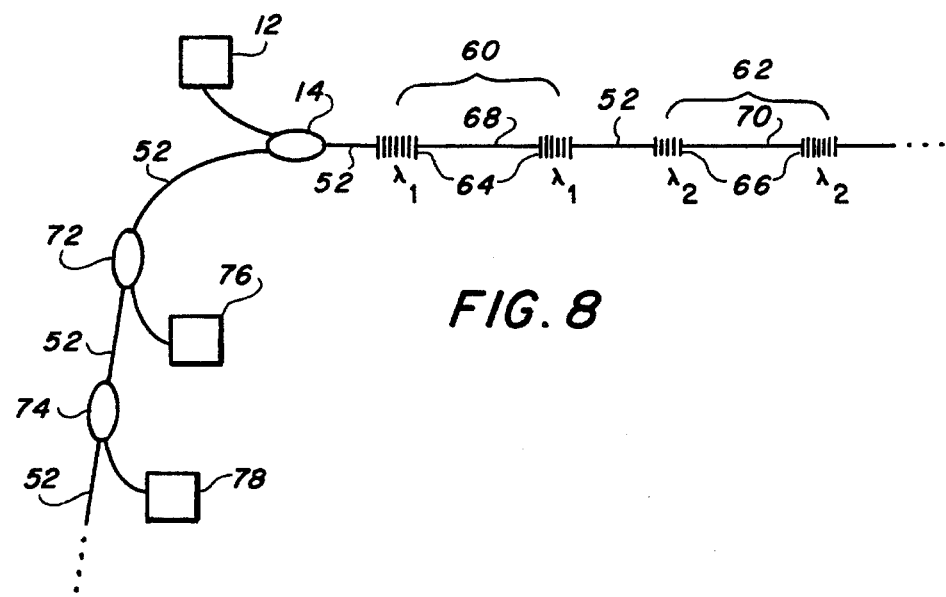
FIG. 8 illustrates a multiple strain measurement embodiment.

A second version of the linear cavity embodiment is illustrated in FIG. 8. In this version multiple cavities 60, 62, etc are created by using pairs of FBG's 64 and 66 each having a different Bragg wavelength. The active fiber sections 68 and 70 preferably have different absorption characteristics so that as the pump light travels from the pump laser 12 toward the last cavity the absorption by the cavity fiber gets stronger. The output side includes multiple WDM couplers 72 and 74 that couple the beat note output light from each cavity to corresponding measurement devices 76 and 78 constructed as previously discussed.

As noted previously sensors of the type described herein are typically temperature sensitive. To overcome this sensitivity to temperature the thermal dependence of the optical path length of the sensor section must be minimized. The temperature dependence of a normalized optical path of $$\frac{d\epsilon_o}{dT} = (n-1)(1+v)\alpha + \frac{n^3 \alpha E}{4}(q_{11} + q_{12}) + \frac{dn}{dT} \quad (10)$$

where n is the refractive index, u is Poisson's ratio, $\alpha$ is the linear thermal expansion coefficient, E is Young's modulus, and $q_{ii}$ are the piezo (stress)-optic coefficients. The values of the relevant parameters for fused silica and zirconium-barium-lanthanum-aluminum (ZBLA) and zirconium-barium-lanthanum-aluminum-sodium (ZBLAN) heavy metal fluoride (HMF) glasses are shown in Table 1 below. The values of the ~10–15% Ge-doped silica optical fiber core glass are similar to those of fused silica; the refractive index of Ge-doped silica core single mode fibers is typically ~1.47. For convenience, the three terms in Eq. (10) will be referred to as the expansion, stress, and thermo-optic terms, and their calculated values and $d\epsilon_o/dT$ are shown in Table 1.

TABLE 1

| Parameter | Fused Silica | ZBLA | ZBLAN |
|---|---|---|---|
| $\alpha (\times 10^{-6}\ C^{-1})$ | 0.55 | 15.7 | 16.5 |
| n | 1.459 | 1.519 | 1.4990 |
| dn/dT $(\times 10^{-6}\ C^{-1})$ | 11 | −9.0 | −13.6 |
| $q_{11}\ (\times 10^{-12}\ Pa^{-1})$ | 0.42 | 1.78 | 1.8 |
| $q_{12}\ (\times 10^{-12}\ Pa^{-1})$ | 2.7 | 1.81 | 1.8 |
| v | 0.17 | 0.30 | 0.31 |
| E $(\times 10^4\ MPa)$ | 7.03 | 5.53 | 5.08 |
| Terms: | | | |
| Expansion $(\times 10^{-6})$ | 0.29 | 10.6 | 10.8 |
| Stress $(\times 10^{-6})$ | 0.094 | 2.73 | 2.54 |
| Thermo-Optic $(\times 10^{-6})$ | 11.0 | −9.0 | −13.6 |
| $d\epsilon_a/dT\ (\times 10^{-6}\ C^{-1})$ | 11.4 | 4.32 | −0.27 |

As can be seen from Table 1 the thermal sensitivity in silica is dominated by the large, positive thermo-optic coefficient. By contrast, the large expansion term in the heavy metal fluoride glasses is balanced by a negative dn/dT, resulting in a ~40-fold decrease in thermal sensitivity. Further decreases in thermal sensitivity can be accomplished since both the expansion coefficient and dn/dT can be adjusted by the additions of other ions to the glass. Completely athermal behavior can be obtained with the addition of ~0.1 mole % $PbF_2$ to the glass, which is often used to raise the refractive index of the core of HMF fibers.

The Er-doped fiber laser strain sensor of the present invention can be constructed entirely of fluoride fiber in any of the embodiments described herein. Athermal ZBLAN single mode fiber can be used as the passive fiber 20 of the strain sensing section in the separate gain and strain sensing embodiment. Er-doped ZBLAN fiber could likewise be used as the active element 10, 54, 68 and 70 of the other embodiments. Lasing of Er and other rare earth ions in HMF fiber has been shown to be much more efficient than in silica-based materials. Construction of the Er-doped fiber ring laser strain sensor using HMF results in an athermal sensor, i.e., completely free of thermal apparent strain.

As discussed above the athermal fiber discussed above can be used with any of the optical fiber strain sensing configurations, including the active cavity configurations, discussed in detail herein as well as with the interferometer configurations of the prior art such as the Mach-Zender, Michelson, and Fabry-Perot configurations.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A strain sensor, comprising:

a laser pump;

an active doped fiber gain section coupled to and pumped to a lasing state by the said pump; and a measurement device coupled to said gain section and measuring strain responsive to an oscillation frequency of light exiting from said gain section; wherein said measurement device comprises a beat frequency measurement device measuring a beat frequency of two oscillation modes of said section.

2. A sensor as recited in claim 1, wherein said gain section forms a ring cavity.

3. A sensor as recited in claim 2, wherein said strain sensing section comprises a mode locked fiber ring.

4. A sensor as recited in claim 1, wherein said gain section forms a linear cavity.

5. A sensor as recited in claim 1, wherein said gain section comprises:

a Bragg grating coupled to said pump;

an Er-doped fiber coupled to said grating; and a mirror coupled to said fiber.

6. A sensor as recited in claim 1, wherein said gain section comprises an Er-doped optical fiber ring.

7. A sensor as recited in claim 1, wherein said gain section comprises an athermal, heavy metal glass fluoride, optical fiber.

8. A sensor as recited in claim 1, further comprising a fiber strain sensing section coupled to said gain section and wherein said measurement device measures oscillation in said strain sensing and gain sections.

9. A sensor as recited in claim 8, wherein said measurement device measures a beat frequency of two oscillation modes in said strain sensing and gain sections.

10. A sensor as recited in claim 8, wherein said strain sensing and gain sections form a ring cavity.

11. A sensor as recited in claim 8, wherein said strain sensing and gain sections form a linear cavity.

12. A strain sensor, comprising:

a laser pump;

a ring laser cavity coupled to said pump, said cavity comprising:

a wavelength division multiplexer coupler coupled to said pump;

an Er-doped, athermal, heavy metal glass, optical fiber coupled to said multiplexer coupler;

a 3 dB output coupler coupled to said Er-doped fiber; and a strain sensing, athermal, heavy metal fluoride glass, optical fiber coupled between said multiplexer and 3 dB couplers; and a multi-mode beat frequency measurement device coupled to said 3 dB output coupler.

13. A fiber optic sensor, comprising:

a fiber optic laser cavity;

means for pumping said cavity; and a fiber optic gain portion;

wherein said cavity, said means for pumping, and said gain portion are operatively interconnected to produce a plurality of laser beat frequencies in said cavity; and wherein said sensor further comprises means for detecting frequency change, induced by mechanical straining of at least a portion of said cavity, of a preselected one of said beat frequencies.

* * * * *